United States Patent [19]

Hums et al.

[11] Patent Number: 4,849,392

[45] Date of Patent: Jul. 18, 1989

[54] CATALYST MATERIAL FOR REDUCING THE NITROGEN OXIDES IN FLUE GASES

[75] Inventors: Erich Hums, Erlangen; Dietmar Hein, Nürnberg; Helmut Schmelz, Prien, all of Fed. Rep. of Germany

[73] Assignee: Siemens Aktiengesellschaft, Berlin and Munich, Fed. Rep. of Germany

[21] Appl. No.: 21,443

[22] Filed: Mar. 4, 1987

[30] Foreign Application Priority Data

Mar. 6, 1986 [DE] Fed. Rep. of Germany ....... 3607436

[51] Int. Cl.$^4$ ........................ B01J 21/06; B01J 23/22; B01J 27/18
[52] U.S. Cl. .................................... 502/209; 502/216; 502/309; 502/325; 502/338; 502/340; 502/345; 502/350
[58] Field of Search ............... 502/209, 216, 309, 325, 502/338, 340, 345, 350

[56] References Cited

U.S. PATENT DOCUMENTS 3,799,888  3/1974  Suvorov et al. ..................... 502/309
4,085,193  4/1978  Nakajima et al. ............... 502/309 X
4,207,209  6/1980  Matsuda et al. ................ 502/309 X Primary Examiner—W. J. Shine
Attorney, Agent, or Firm—Herbert L. Lerner; Laurence A. Greenberg

[57] ABSTRACT

A catalyst material for nitrogen oxide reduction in flue gases in the presence of ammonia, comprising hydrothermal titanium dioxide and the additives of vanadium oxide and one or more oxides of the elements tungsten, phosphorus, sulfur, chromium, zirconium, magnesium, copper, cobalt, iron, and uranium, which hydrothermal titanium dioxide and additives material is activated by grinding.

5 Claims, 1 Drawing Sheet

| Typ | Ti | W | V |
|-----|----|----|---|
| W 10 | 85 | 10 | 5 |
| HT | 85 | 10 | 5 |

…

CATALYST MATERIAL FOR REDUCING THE NITROGEN OXIDES IN FLUE GASES

BACKGROUND OF THE INVENTION

1. Field of the Invention

The invention relates to a catalyst material for reducing the nitrogen oxides in flue gases in the presence of ammonia.

2. Description of the Prior Art

German patent application DE-AS No. 24 58 888 (equivalent to U.S. Pat. No. 4,085,193), discloses a catalyst material which aids in catalytically reducing nitrogen oxides in exhaust gases in the presence of ammonia into molecular nitrogen. Titanium oxide and vanadium oxide, along with a number of other additives, such as molybdenum, tungsten, nickel, and cobalt, are used as the catalytically effective combination. These substances that are catalytically effective in combination are obtained in the form of hydroxides or water-soluble salts solely by coprecipitation with titanium acid. They are subsequently dried and calcined. The nitrogen oxides in flue gases in the presence of ammonia can be reduced with this catalyst material. However, the full effectiveness of this catalyst material is attained only at relatively high flue gas temperatures.

Another catalyst material has been proposed for reducing the nitrogen oxides in flue gases (German Pat. No. 35 31 810.4, and its equivalent U.S. patent application Ser. No. 904,184 filed Sept. 5, 1986), in which the calcined titanium oxide is used in the form of octahedrite and is coated only on the surface with vanadium oxide and tungsten oxide. With this catalyst material, the catalytic activity can be shifted to lower flue gas temperatures. It has been found that the durability of the octahedrite modification of the titanium oxide is dependent not only on temperature but also on various pretreatment factors.

SUMMARY OF THE INVENTION

It is accordingly an object of the invention to provide a catalyst material for reducing the nitrogen oxides in flue gases that is sufficiently effective, that widens the temperature range of optimal catalytic activity toward lower temperatures, that increases the durability of the catalyst material and with which small quantities of additives, in particular oxides, are adequate.

With the foregoing and other objects in view, there is provided in accordance with the invention a catalyst material for nitrogen oxide reduction in flue gases in the presence of ammonia, comprising hydrothermal titanium oxide and additives of vanadium oxide and one or more oxides of the elements tungsten, phosphorus, sulfur, chromium, zirconium, magnesium, copper, cobalt, iron, and uranium, and said hydrothermal titanium oxide and additives activated by grinding.

Other features which are considered as characteristic for the invention are set forth in the appended claims.

Although the invention is illustrated and described herein as embodied in catalyst material for reducing the nitrogen oxides in flue gases, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with, the accompanying drawings, in which.

DESCRIPTION OF THE PREFERRED EMBODIMENTS

Figures 1, 2:
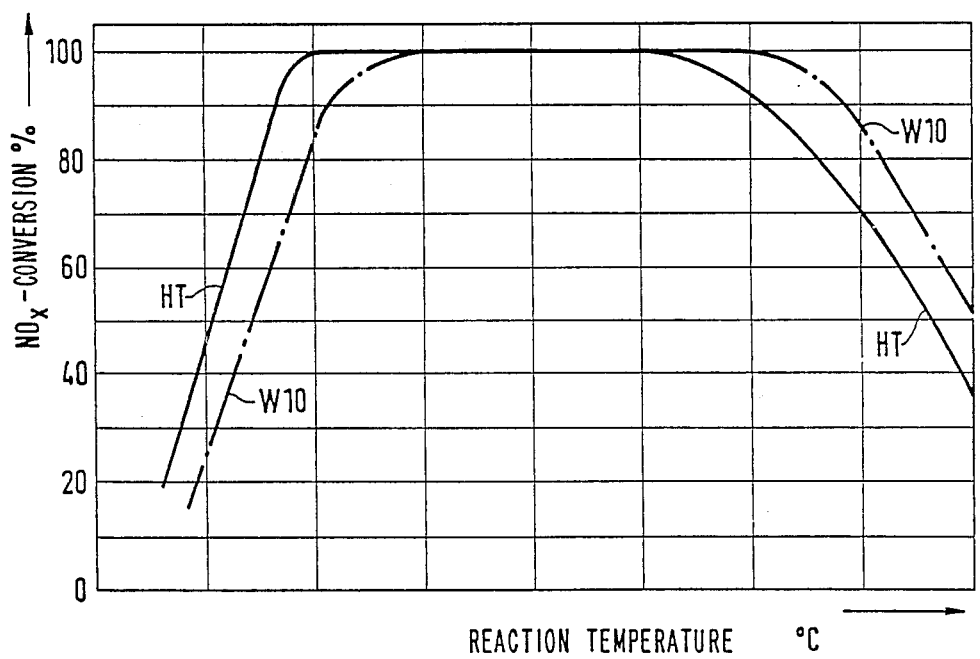
FIG. 1 sets forth two catalysts designated "W 10" and "HT", each catalyst having the same atom percent of tungsten oxide, vanadium oxide and titanium dioxide.
FIG. 2 is a comparison of the conversion rates of these two catalysts as a function of the reaction temperature.

Hydrothermal titanium oxide for use in the invention is commercially available. By using hydrothermal titanium oxide available in commerce, a phase change, such as rutilization in the interior of the crystal, is suppressed.

Hydrothermal material is virtually free of foreign ions and thus has few lattice voids. Because of the activation by grinding, the lattice voids required for the catalytic activity are produced only on the surface of the crystals.

In a particularly advantageous manner, the hydrothermal material can be ground along with the intended oxides in a suspension with deionized water or organic ion-forming solvents such as alcohols or acetic acid. The resultant increased reactivity of the ground solids is not due so much to the increase in surface area; instead, depending on the type, intensity and duration of the energy input during grinding, it leads to lattice voids, phase changes and modification changes. These effects are only on the surface, however. They do not produce phase changes in the interior of the titanium dioxide crystal lattice, or the aforementioned negative results thereof.

Further details of the invention will be explained in the ensuing description, referring to the drawing figures.

In accordance with the exemplary embodiments shown in the drawings for the catalyst materials "W 10" and "HT", the hydrothermal titanium oxide ($TiO_2$) is ground with vanadium oxide (for example, $V_2O_5$), and tungsten oxide ($WO_3$) in a suspension with deionized water. In a departure from the exemplary embodiment, one may also use, in addition to the vanadium oxide, one or more oxides of the elements phosphorus, sulfur, chromium, zirconium, magnesium, copper, cobalt, iron and uranium. The energy input in the grinding process may be attained in the simplest case by means of suitable dissolver-drive mechanisms, unless special mills (such as attrition mills) are to be used. The ground product is first dried and then calcined. The coating of the titanium oxide surface with the various oxides ground with it can also be done incrementally by means of repeated grinding and calcination. After the last calcination, the catalyst material is once again ground, as the final operation. The ready-to-use catalyst material obtained in this way has the composition shown in FIG. 1 in terms of atom percent. As FIG. 1 shows, the composition of the catalyst material "HT" obtained from hydrothermal titanium oxide is the same as that of the catalyst material "W 10" obtained from a different titanium oxide. Nevertheless, FIG. 2 shows that the temperature range of increased catalytic activity of "HT" is shifted farther toward lower temperatures as compared with that of "W 10". It will be apparent that the catalytic activity of "W 10" is itself already shifted toward lower temperatures as compared to other already known catalysts containing titanium oxide.

It has been found that the effect on the phase transformation, for example such as that occurring from rutilization, is very sensitive to additions of foreign ions. This is expressed directly in the durability of the catalyst. It has also been found that such foreign ions not only accelerate the phase transformation, but can also impede it. The titanium acids precipitated out under hydrothermal conditions lead to products containing adjustable proportions of foreign ions. When hydrothermal titanium oxide is used, a material is used the crystal lattice of which is virtually free of imperfections; that is, the concentration of possible sources of phase transformation is minimized. The lattice defects required for the catalytic activity are not produced on the surface until the ensuing preparation of the activation by grinding in the presence of the added oxides. Among the metal oxides added in the exemplary embodiment is vanadium oxide, which has an accelerated effect on the phase transformation. While titanium oxide has a coprecipitated history and unlike the hydrothermal material already contains vanadium oxide in its crystal lattice because of how it has been manufactured, the hydrothermal material in the interior of the titanium dioxide crystallites is free of vanadium oxide. Because of its lack of lattice voids, the oxides applied to its surface have a reduced tendency to diffuse into the crystal lattice.

As a result, the quantity of oxides that must be added is also much less, because they envelop only the surface of the titanium dioxide crystallites, rather than penetrate them uniformly as in the coprecipitation process described in German Pat. No. 24 58 888 mentioned at the outset above. The elements added in the form of oxides are present in the sum in an amount of up to 30 atom percent, referred to titanium.

There is claimed:

1. A catalyst material for nitrogen oxide reduction in flue gases in the presence of ammonia, comprising hydrothermal titanium oxide and additives of vanadium oxide and one or more oxides of the elements tungsten, phosphorus, sulfur, chromium, zirconium, magnesium, copper, cobalt, iron and uranium, said hydrothermal titanium oxide and additives being activated by grinding in a dissolver-driver mechanism or an attrition mill.

2. A catalyst material as defined by claim 1, wherein the elements added in the form of oxides are present in the sum in an amount of up to 30 atom percent, referred to titanium.

3. A catalyst material as defined by claim 1, wherein the hydrothermal titanium oxide along with the added oxides is ground in a suspension with deionized water.

4. A catalyst material as defined by claim 1, wherein the hydrothermal titanium oxide along with the added oxides is ground in a suspension with organic ion-forming solvents.

5. A catalyst material as defined by claim 1, wherein the catalyst material activated by grinding is sintered or calcined, and the sintered of calcined material is ground again.

* * * * *